(12) United States Patent
Lim et al.

(10) Patent No.: US 8,305,377 B2
(45) Date of Patent: Nov. 6, 2012

(54) IMAGE PROCESSING METHOD

(75) Inventors: Hwa Sup Lim, Hwaseong-si (KR); Byong Min Kang, Incheon (KR); Kee Chang Lee, Yongin-si (KR); Seong Jin Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 775 days.

(21) Appl. No.: 12/385,625

(22) Filed: Apr. 14, 2009

(65) Prior Publication Data

US 2010/0097389 A1    Apr. 22, 2010

(30) Foreign Application Priority Data

Jul. 15, 2008  (KR) .................. 10-2008-0068515

(51) Int. Cl.
    *G06T 15/00*    (2011.01)
(52) U.S. Cl. .................. 345/420; 345/419; 345/428
(58) Field of Classification Search .................. 345/419, 345/420, 428, 619, 629
    See application file for complete search history.

(56) References Cited

FOREIGN PATENT DOCUMENTS

| JP | 9-73554 | 3/1997 |
|----|---------|--------|
| JP | 2007-285953 | 11/2007 |
| KR | 1999-010028 | 2/1999 |
| KR | 10-2007-0054593 | 5/2007 |

OTHER PUBLICATIONS

Hsu et al, Performance of a Time of Flight range Camera for Intelligent Vehicle Safety Applications, 2006, VDI-Buch, pp. 205-219.*
Radmer et al, Incident Light related distance error study and calibration of the PMD-range imaging camera, IEEE Computer Vision and Pattern Recognition, Jun. 23, 2008, pp. 1-6.*
Lindner et al, Calibration of the Intensity-Related Distance Error of the PMD TOF-camera, Computer Graphics and Vision, Sep. 2007, pp. 1-8.*
"Large-depth integral imaging scheme by use of a 3D depth camera", Proceedings of the Optical Society of Korea Summer Meeting 2006, pp. 473-474.

* cited by examiner

*Primary Examiner* — Phu K Nguyen
(74) *Attorney, Agent, or Firm* — Staas & Halsey LLP

(57) ABSTRACT

An image processing method which determines and depth-unfolds a depth folding region in an input depth image. A depth folding region of an input depth image may be determined based on a variance of the input depth, image or a gradient image. A predetermined first depth value may be added to a depth value of each pixel of the determined depth folding region and depth information of the input depth image may be updated.

20 Claims, 13 Drawing Sheets

IMAGE PROCESSING METHOD

CROSS-REFERENCE TO RELATED APPLICATIONS

This application claims the priority benefit of Korean Patent Application No. 10-2008-0068515, filed on Jul. 15, 2008, in the Korean Intellectual Property Office, the disclosure of which is incorporated herein by reference.

BACKGROUND

1. Field

Exemplary embodiments relate to an image processing method, and more particularly, to an image processing method which determines and depth-unfolds a depth folding region in an input depth image.

2. Description of the Related Art

Currently, information about a three-dimensional (3D) image is widely used in a variety of applications. In general, 3D information includes geometry information and color information.

Geometry information may be obtained using a depth image. A depth image may be indirectly obtained using software called computer vision technology, or directly obtained using a hardware device such as a depth camera.

According to a principle of depth camera, for example, light such as infrared (IR) light is irradiated to an object, and a Time of Flight (TOF) is measured by sensing reflected light to measure a distance (depth) from a depth camera to each part of the object.

In a method of calculating a TOF and depth, a phase contrast between an incident wave and reflected wave is measured to calculate a TOF of a specific light such as IR. However, when a phase contrast exceeds 360 degree, a return driving time may be erroneously calculated.

The above-described phenomenon is referred to as a range folding. Particularly, a phenomenon associated with a depth image obtained by a depth camera is referred to as a depth folding. The depth folding may be overcome by introducing a plurality of light sources with different frequencies in a depth camera. However, such method may increase hardware complexity.

SUMMARY

Exemplary embodiments may provide an image processing method which determines a depth folding region of an input depth image, and thereby may improve accuracy of three-dimensional (3D) geometry information through depth unfolding.

Other exemplary embodiments may also provide an image processing method which is capable of depth unfolding of a depth folding region of an input depth image.

Exemplary embodiments may provide an image processing apparatus, the image processing apparatus including: a first pixel group extraction unit to extract a pixel with a spatial variance from each pixel of an input depth image as a first pixel group, the spatial variance being greater than a first threshold value; and a depth folding region determination unit to determine a depth folding region of the input depth image based on information about the first pixel group.

According to other exemplary embodiments, the image processing apparatus may further include a depth folding line determination unit to determine a depth folding line of the input depth image based on a gradient of the input depth image, and the depth folding region determination unit may determine the depth folding region of the input depth image based on the information about the first pixel group and information about the depth folding line of the input depth image.

Exemplary embodiments may provide an image processing method, the image processing method including: calculating a spatial variance of each pixel of an input depth image; and extracting a pixel with a spatial variance greater than a first threshold value from each of the pixels of the input depth image as a first pixel group.

According to other exemplary embodiments, the image processing method may further include: determining a depth folding region of the input depth image based on information about the first pixel group.

In this instance, a depth folding line of the input depth image may be determined based on a gradient of the input depth image, and the depth folding region may be determined based on the information about the first pixel group and information about the depth folding line of the input depth image.

According to still other exemplary embodiments, a depth folding line of the input depth image may be determined based on a gradient of the input depth image and a gradient of an input intensity image associated with the input depth image.

According to yet other exemplary embodiments, a depth folding line of the input depth image may be determined based on a gradient of the input depth image and a gradient of an input color image associated with the input depth image.

In this instance, a region segmentation may be performed based on at least one of the information about the first pixel group and the information about the depth folding line of the input depth image to determine the depth folding region of the input depth image.

According to other exemplary embodiments, a depth value of each pixel of the depth folding region of the input depth image may be added to a predetermined first depth value and the depth value of the input depth image may be updated.

According to still other exemplary embodiments, there may be provided an image processing method, the image processing method including: extracting a first pixel group from each pixel of an input depth image, the first pixel group including a pixel with a spatial variance greater than a first threshold value; extracting a second pixel group from each pixel of an input intensity image associated with the input depth image, the second pixel group including a pixel with an intensity less than a second threshold value; and determining a depth folding region of the input depth image based on information about the first pixel group and second pixel group.

According to yet other exemplary embodiments, there may be provided an image processing method, the image processing method including: calculating a temporal variance of each pixel of a plurality of input depth images associated with a single object; extracting a pixel with a temporal variance greater than a third threshold value from each of the pixels of the plurality of input depth images as a first pixel group; and determining a depth folding region of the plurality of input depth images based on information about the first pixel group.

Additional aspects, features, and/or advantages exemplary embodiments will be set forth in part in the description which follows and, in part, will be apparent from the description, or may be learned by practice of the exemplary embodiments.

BRIEF DESCRIPTION OF THE DRAWINGS

These and/or other aspects of exemplary embodiments will become apparent and more readily appreciated from the following descriptions, taken in conjunction with the accompanying drawings of which.

DETAILED DESCRIPTION

Figure 1:
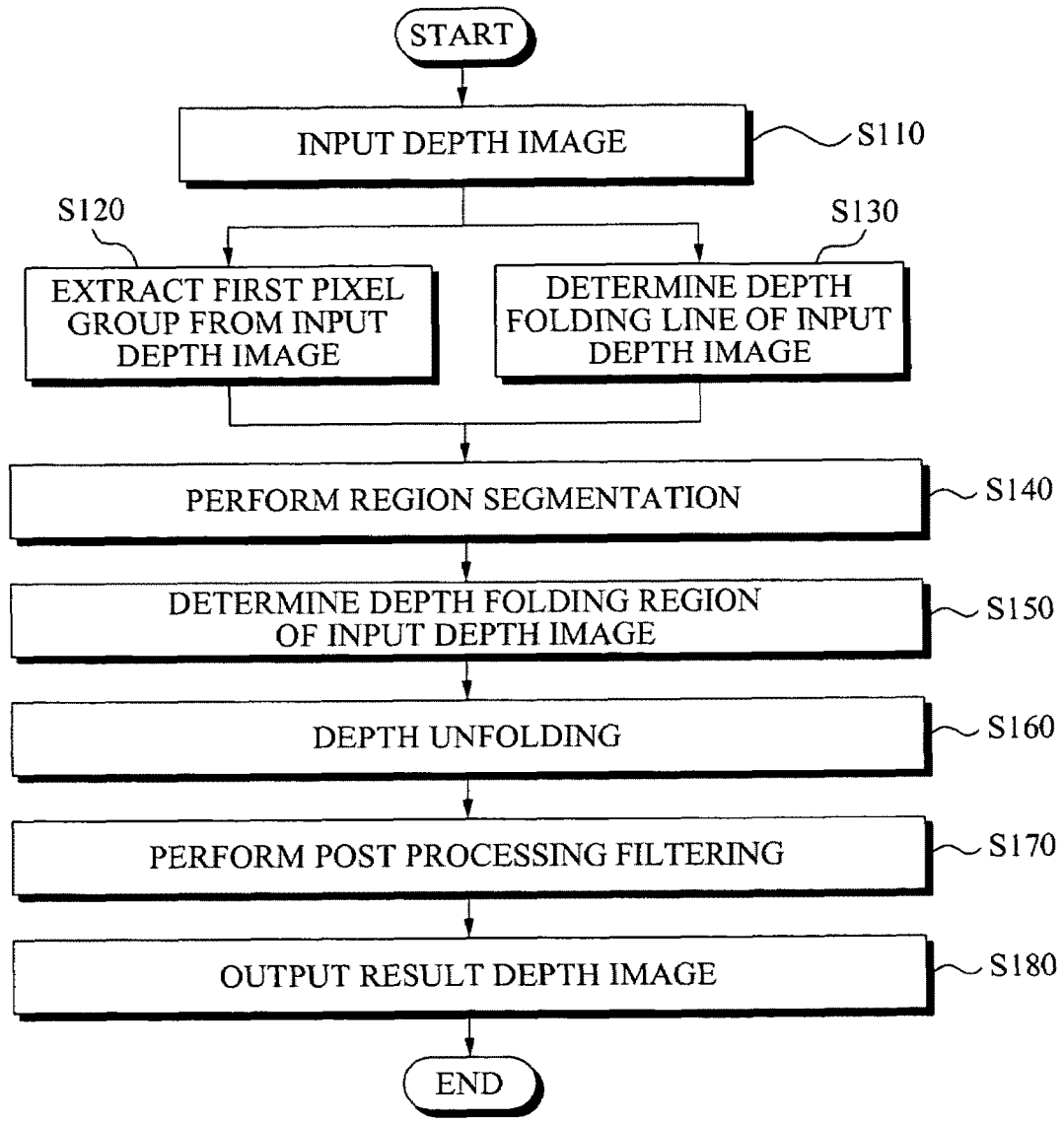
FIG. 1 is a flowchart illustrating an image processing method according to exemplary embodiments.

Reference will now be made in detail to exemplary embodiments which are illustrated in the accompanying drawings, wherein like reference numerals refer to the like elements throughout. Exemplary embodiments are described below to explain the disclosure by referring to the figures.

FIG. 1 is a flowchart illustrating an image processing method according to exemplary embodiments.

In operation S110, a depth image is inputted.

A depth folding occurs in an object in the input depth image. The object is located beyond a maximum measurement distance.

In operation S120, a depth folding pixel where the depth folding occurs is extracted from the input depth image. Hereinafter, the depth folding pixel is referred to as a first pixel group.

According to exemplary embodiments, the first pixel group may be extracted using a spatial variance of each pixel of the input depth image. A first threshold value, which is a spatial variance in a maximum measurement distance of a depth camera, is provided. In this instance, the depth folding does not occur in the maximum measurement distance. A pixel with a spatial variance greater than the first threshold value in the input depth image may be extracted as the first pixel group.

According to other exemplary embodiments, the first pixel group may be extracted using a temporal variance of each pixel of the input depth image. A third threshold value, which is a temporal variance in the maximum measurement distance of the depth camera, is provided. A pixel with a temporal variance greater than the third threshold value in the input depth image may be extracted as the first pixel group. Also, a pixel having the spatial variance greater than the first threshold value and the temporal variance greater than the third threshold value may be extracted as the first pixel group.

When an intensity image is inputted, a second threshold value and an intensity of each pixel of the input intensity image may be compared. The second threshold value is an average intensity value in the maximum measurement distance of the depth camera. In this instance, pixels with an intensity less than the second threshold value are determined as the first pixel group.

Also, a pixel having the spatial variance greater than the first threshold value, the temporal variance greater than the third threshold value, and the intensity less than the second threshold value may be determined as the first pixel group.

In operation S130, a depth folding line of the input depth image is determined.

According to exemplary embodiments, a line of pixels with a high gradient value is extracted from the input depth image, and the line is determined as the depth folding line.

When an intensity image is inputted, a gradient of the input depth image and a gradient of the input intensity image may be compared. When a pixel where a gradient of depth image is high and a gradient of input intensity image corresponding to the depth image is low exists in the input depth image, the pixel may be located in a boundary area between an area where the depth folding occurs and an area where the depth folding does not occur. Accordingly, a line of the above-described pixel may be determined as the depth folding line of the input depth image.

Also, when a color image matched with the input depth image is inputted, a gradient of the input depth image and a gradient of the input color image may be compared. When a pixel where a gradient of depth image is high and a gradient of input color image corresponding to the depth image is low exists in the input depth image, the pixel may be located in the boundary area between the area where the depth folding occurs and the area where the depth folding does not occur. Accordingly, a line of the above-described pixel may be determined as the depth folding line of the input depth image.

Also, the gradients of the input depth image, the input intensity image, and the input color image may be compared. In this case, an error may decrease.

In operation S140, a region segmentation of the input depth image is performed. Since the determined first pixel group or depth folding line may not be continuous, and the area where the depth folding occurs and the area where the depth folding does not occur may not be precisely segmented due to an error, the region segmentation is to be performed.

The region segmentation may be performed based on information about the first pixel group. Also, the region segmentation may be performed based on the information about the first pixel group and information about the depth folding line of the input depth image.

For example, the region segmentation may be performed more accurately through a hole filling in the depth folding line or the first pixel group which is discontinuous. Also, an accuracy of the region segmentation may be improved by referring to information about neighboring pixels of a pixel using a Markov random field.

In operation S150, a depth folding region of the input depth image is determined. The depth folding region may be determined using the information about the first pixel group and/or information about the depth folding line based on a result of the region segmentation.

In operation S160, depth information such as a depth value of the input depth image is updated.

According to exemplary embodiments, a depth value corresponding to the maximum measurement distance is added to each pixel of the depth folding region determined in operation S150, and thus the depth value is updated for depth unfolding.

In operation S170, a post processing filtering is performed with respect to the input depth image having the depth unfolding performed thereon in operation S160.

A pixel where the depth unfolding is not performed may exist around the depth folding line (a boundary between the determined depth folding region and another region excluding the depth folding line), although the pixel is included in the depth folding region. Also, a pixel where the depth unfolding is performed may exist around the determined depth folding line, even though the pixel is not included in the depth folding region. Accordingly, an outlier is removed from the input depth image through the post processing filtering, and thus a more precise result may be obtained. For example, the filtering may be a Median filter.

In operation S180, a result depth image from performing the post processing filtering is outputted.

Figure 2:
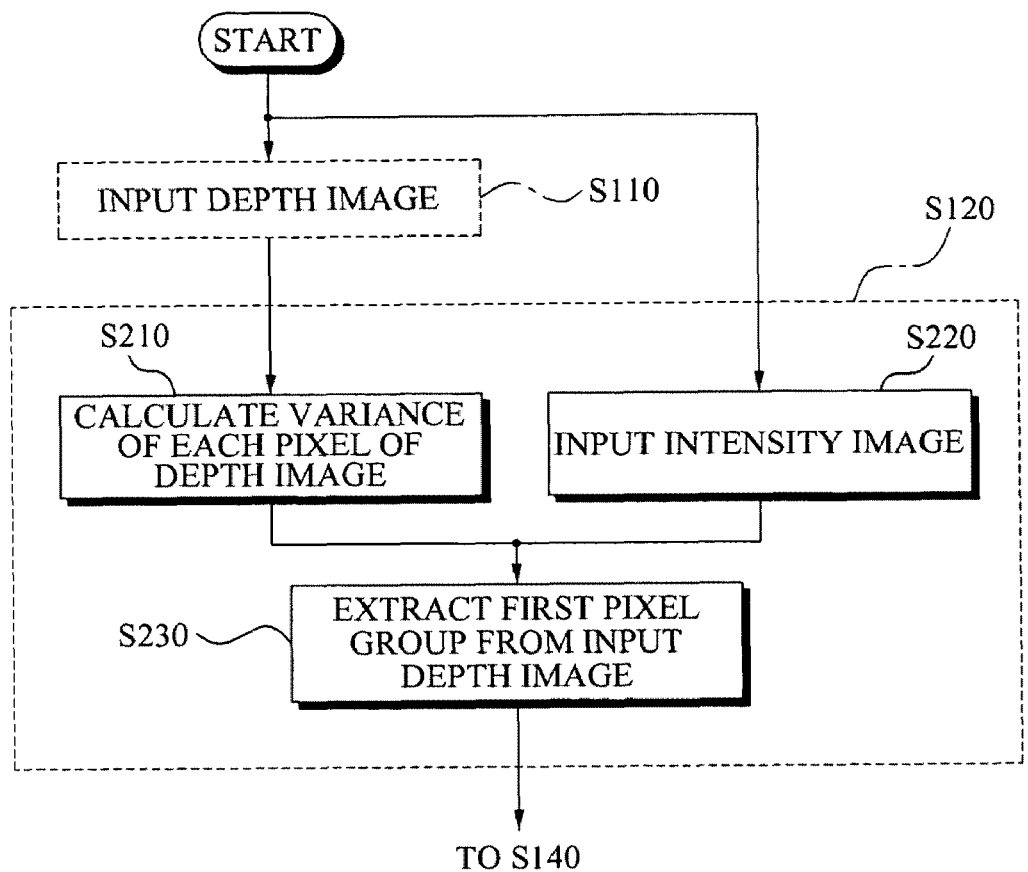
FIG. 2 is a flowchart illustrating an operation of extracting a first pixel group from the input depth image according to exemplary embodiments.

FIG. 2 is a flowchart illustrating an operation of extracting the first pixel group from the input depth image according to exemplary embodiments.

In operation S210, a depth-variance of each pixel of the input depth image is calculated.

When a Time of Flight (TOF)-depth camera is used, a variance of a measured depth value increases due to a decrease of reflected waves, as a distance between the depth camera and an object increases.

In general, when a single depth image is inputted, a spatial variance may be calculated. The spatial variance is associated with a difference between a depth value of a pixel and a depth value of a neighboring pixel.

When a plurality of depth images associated with a same object is inputted, a temporal variance of a depth value of each pixel may be calculated.

In operation S220, an intensity image is inputted. The intensity image may be obtained by sensing intensity of reflected light from a sensor unit of a depth camera, while obtaining the depth image.

Since an intensity of reflected light is relatively high in an area corresponding to an object located close to the depth camera, the area is shown brightly. Also, since an intensity of reflected light is relatively low in an area corresponding to an object far from the depth camera, the area is dark.

Accordingly, it may be determined whether an object is close to the depth camera using the intensity image.

In operation S230, a first pixel group where a depth folding occurs is extracted from the input depth image.

According to exemplary embodiments, the first pixel group may be extracted using a spatial variance of each pixel of the input depth image. A first threshold value, which is a spatial variance in a maximum measurement distance of the depth camera, is provided. In this instance, the depth folding does not occur in the maximum measurement distance. A pixel with a spatial variance greater than the first threshold value in the input depth image may be extracted as the first pixel group.

According to other exemplary embodiments, the first pixel group may be extracted using a temporal variance of each pixel of the input depth image. A third threshold value, which is a temporal variance in the maximum measurement distance of the depth camera, is provided. A pixel with a temporal variance greater than the third threshold value in the input depth image may be extracted as the first pixel group.

Also, a pixel having the spatial variance greater than the first threshold value and the temporal variance greater than the third threshold value may be extracted as the first pixel group.

A second threshold value and an intensity of each pixel of the input intensity image may be compared. The second threshold value is an average intensity value in the maximum measurement distance of the depth camera. In this instance, pixels with an intensity less than the second threshold value are determined as the first pixel group.

Also, a pixel having the spatial variance greater than the first threshold value, the temporal variance greater than the third threshold value, and the intensity less than the second threshold value may be determined as the first pixel group.

Figure 3:
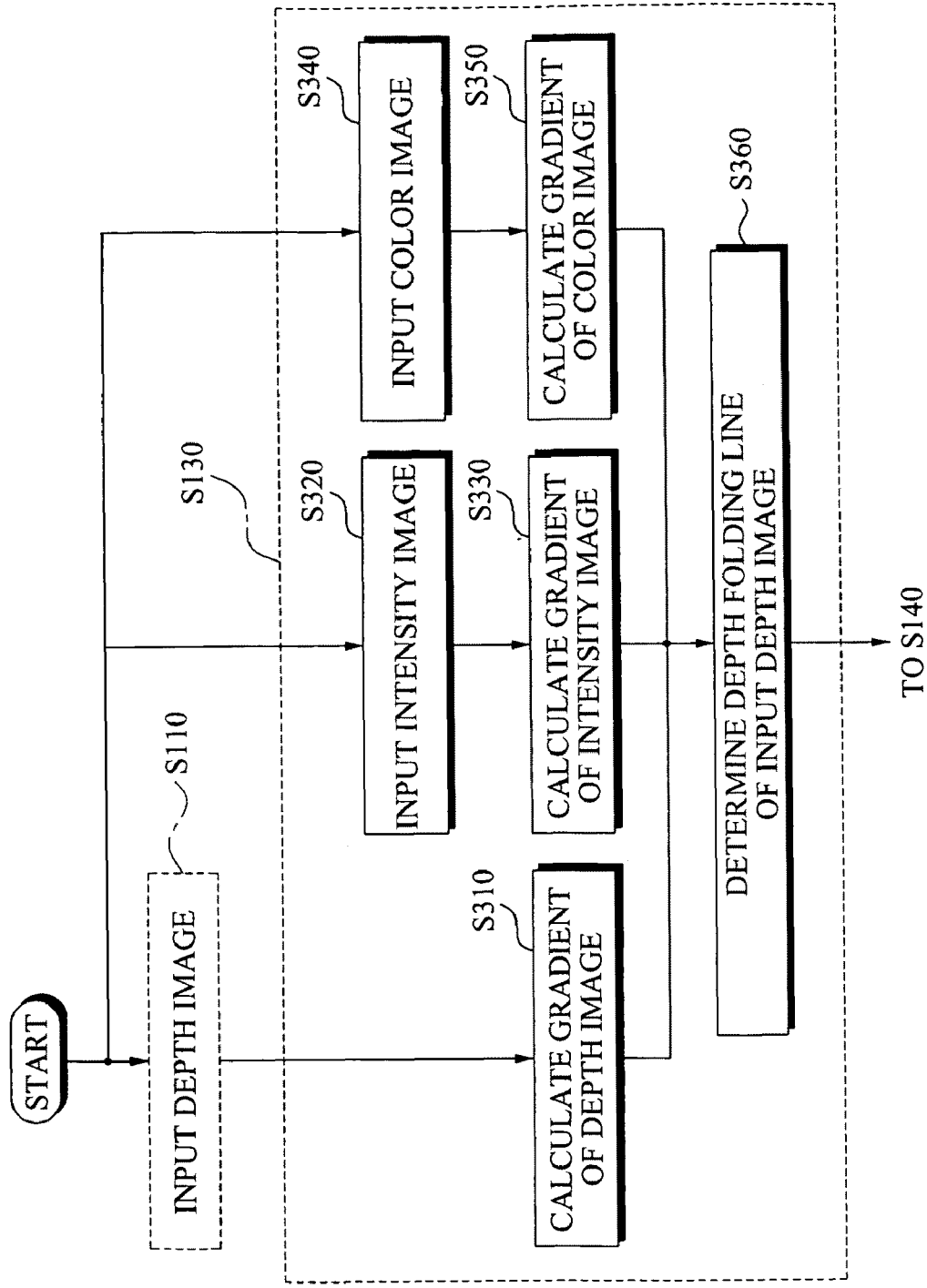
FIG. 3 is a flowchart illustrating an operation of determining a depth folding line of the input depth image according to exemplary embodiments.

FIG. 3 is a flowchart illustrating an operation of determining a depth folding line of the input depth image according to exemplary embodiments.

In operation S310, a gradient of the input depth image is calculated.

The gradient of the input depth image is high in an area where a depth value significantly changes. Accordingly, an area with a high gradient value may be an area where the depth value significantly changes, and thereby may be the depth folding line.

In operation S320, an intensity image is inputted. The input intensity image includes information about whether an object is located close to the depth camera.

In operation S330, a gradient of the input intensity image is calculated.

The gradient of the input intensity image is high in the area where the depth value significantly changes or an area where an intensity significantly changes due to various factors such as lighting. Accordingly, an area with a low gradient of the input intensity image may not be the area where the depth value significantly changes.

In operation S340, a color image is inputted. The color image may have a same viewpoint and resolution as the input depth image. However, when a viewpoint or resolution is different, a matching process is required.

In operation S350, a gradient of the input color image is calculated.

The gradient of the input color image is high in an area where the depth value significantly changes or an area where a color value significantly changes due to various factors such as a color, brightness, and the like, of an object. Accordingly, an area with a low gradient of the input color image may not be the area where the depth value significantly changes.

In operation S360, the depth folding line of the input depth image is determined.

According to exemplary embodiments, a line of pixels with a high gradient of the input depth image is extracted, and the line is determined as the depth folding line of the depth image.

However, a gradient value may be high in an area excluding the depth folding line. In this case, the gradient of the input depth image, calculated in operation S310, and the gradient of the input intensity image, calculated in operation S330, may be compared.

When a pixel where a gradient of depth image is high and a gradient of the input intensity image corresponding to the depth image is low exists in the input depth image, the pixel may be located in a boundary area between an area where the depth folding occurs and an area where the depth folding does not occur. Accordingly, a line of the above-described pixels may be determined as the depth folding line of the input depth image.

Similarly, the gradient of the input depth image, calculated in operation S310, and the gradient of the input color image, calculated in operation S350, may be compared.

When a pixel where a gradient of depth image is high and a gradient of the input color image corresponding to the depth image is low exists in the input depth image, the pixel may be located in the boundary area between the area where the depth folding occurs and the area where the depth folding does not occur. Accordingly, a line of the above-described pixel may be determined as the depth folding line of the input depth image.

Also, the gradients of the input depth image, the input intensity image, and the input color image may be compared. In this case, an error may decrease.

Figure 4:
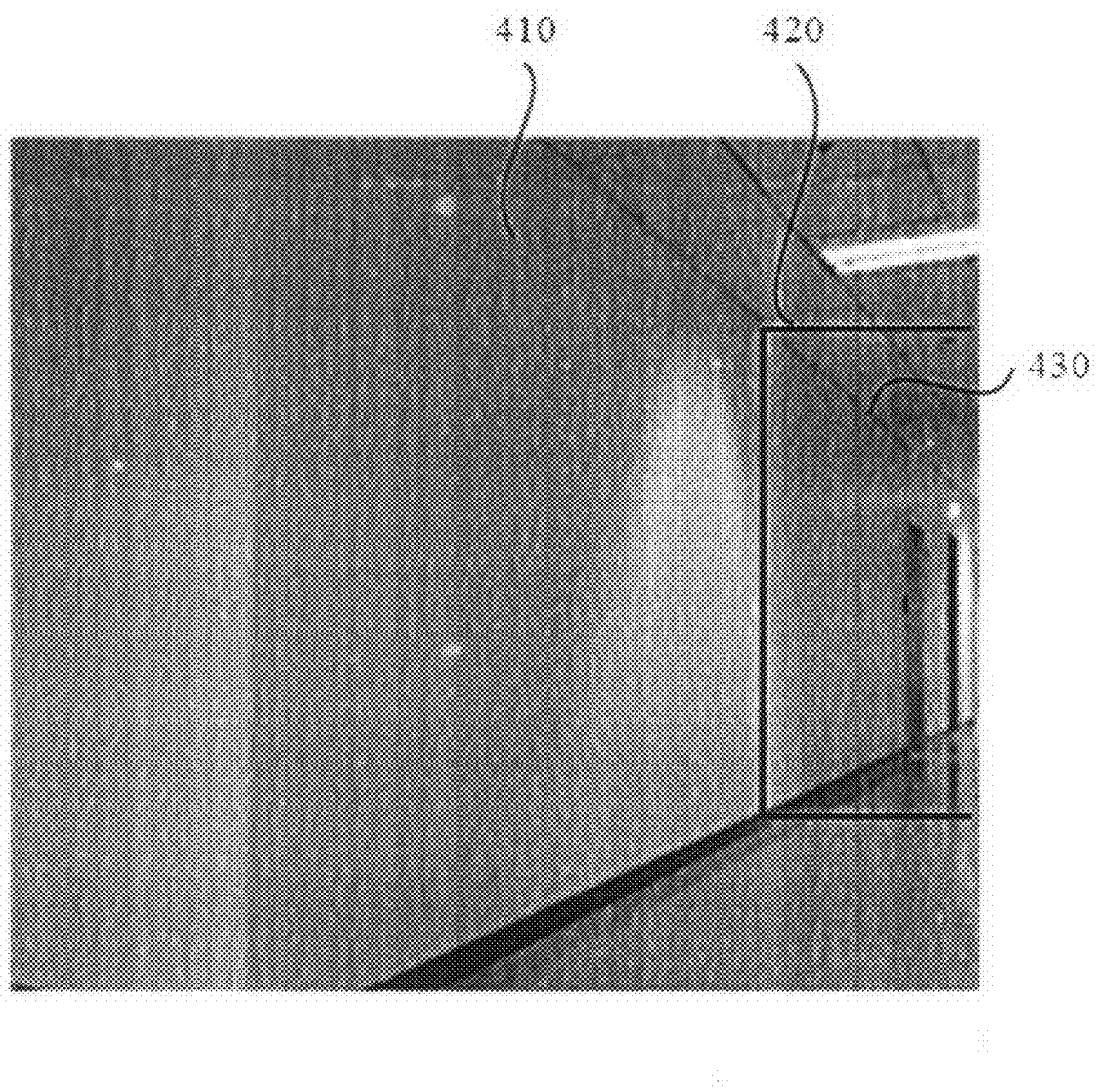
FIG. 4 illustrates an image of an object associated with an input depth image according to exemplary embodiments.

FIG. 4 illustrates an image of an object associated with an input depth image according to exemplary embodiments.

A specification of a depth camera using a single light such as an infrared (IR) light provides information about a maximum distance which may be measured without error due to range folding or depth folding. According to exemplary embodiments, when it is assumed that a maximum measurement distance of the depth camera is 7.5 M, a region 410 located within 7.5 M from the depth camera exists in the object of FIG. 4. Also, a region 430 located beyond 7.5 M exists. A boundary of the region 410 and region 430 is a line 420.

Figure 5:
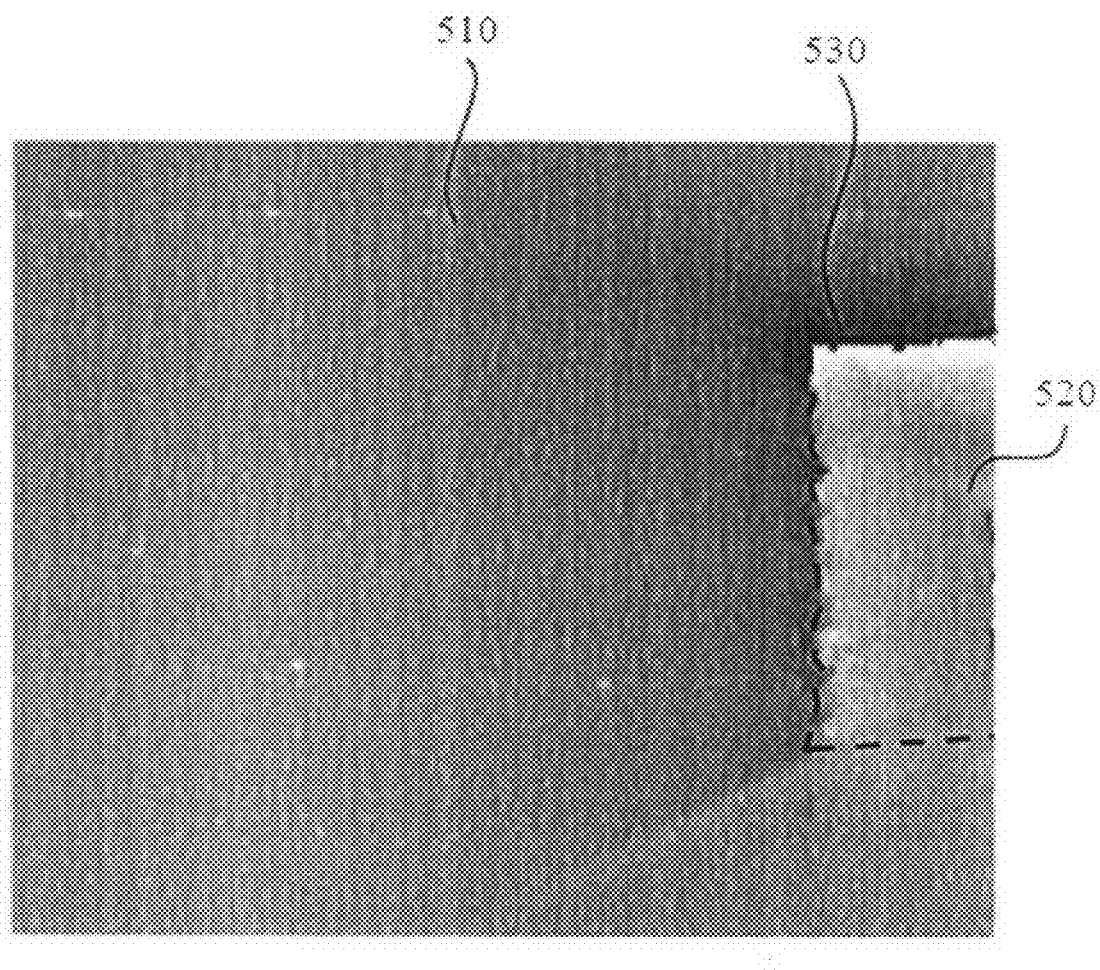
FIG. 5 illustrates an input depth image according to exemplary embodiments.

FIG. 5 illustrates an input depth image associated with the object of FIG. 4 according to exemplary embodiments. In FIG. 5, an area with a high brightness corresponds to an area located relatively close to the depth camera, and an area with a low brightness corresponds to an area located relatively far from the depth camera.

A region 510 corresponds to the region 410 of FIG. 4. Accordingly, the region 510 indicates a depth of an object located within the maximum measurement distance. Also, a region 520 corresponds to the region 420 of FIG. 4, and is an area of an object located beyond the maximum measurement distance. Accordingly, the region 520 is to be darker than surrounding area. However, the region 520 is brighter than the surrounding area due to a depth folding.

Accordingly, when the region 520 is determined as a depth folding region, the depth folding may be depth-unfolded. Also, a depth folding line 530 where the depth folding starts is determined, so that the depth unfolding may be performed more accurately.

Figure 6:
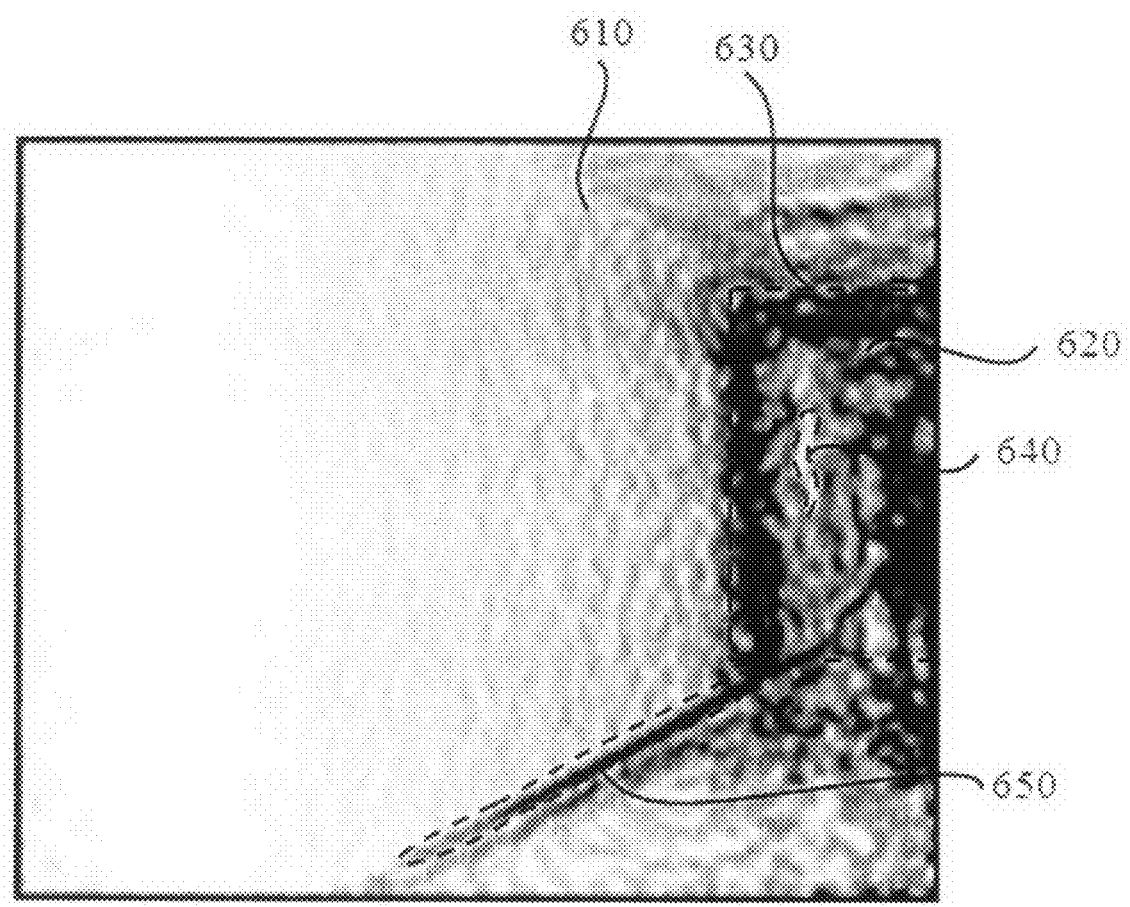
FIG. 6 illustrates a result image where a spatial variance of the input depth image of FIG. 5 is calculated according to exemplary embodiments.

FIG. 6 illustrates a result image where a spatial variance of the input depth image of FIG. 5 is calculated according to exemplary embodiments.

In FIG. 6, as a difference between a depth value of each pixel of the input depth image and a depth value of neighboring pixels increases, an area becomes darker. A depth value of each pixel in a region 610 where a depth folding does not occur is not significantly different from that of neighboring pixels. Accordingly, the region 610 is relatively bright. However, a region 620 is relatively dark, since a variance of a measured depth value increases due to a decrease of reflected waves as a distance between the depth camera and an object increases, when a TOF depth camera is used.

According to exemplary embodiments, a first threshold value which is a spatial variance in the maximum measurement distance is provided. The first threshold value may be provided as a hardware specification of the depth camera, and may be determined by a test. When the first threshold value is provided, an area with a spatial variance greater than the first threshold value may be determined as a depth folding region in the input depth image. The depth folding region is located beyond the maximum measurement distance. A depth folding line 630 may be a boundary between the region 610 and the region 620.

Also, pixels with the spatial variance greater than the first threshold value may be determined as a first pixel group, a region segmentation of the input depth image may be performed based on the first pixel group, and thus the depth folding region may be determined.

Also, an area 640 with a spatial variance less than the first threshold value exists in the depth folding region 620. An area 650 with a spatial variance greater than the first threshold value exists in the region 610 where the depth folding does not occur. The areas 640 and 650 are an error factor when determining the depth folding region.

Figure 7:
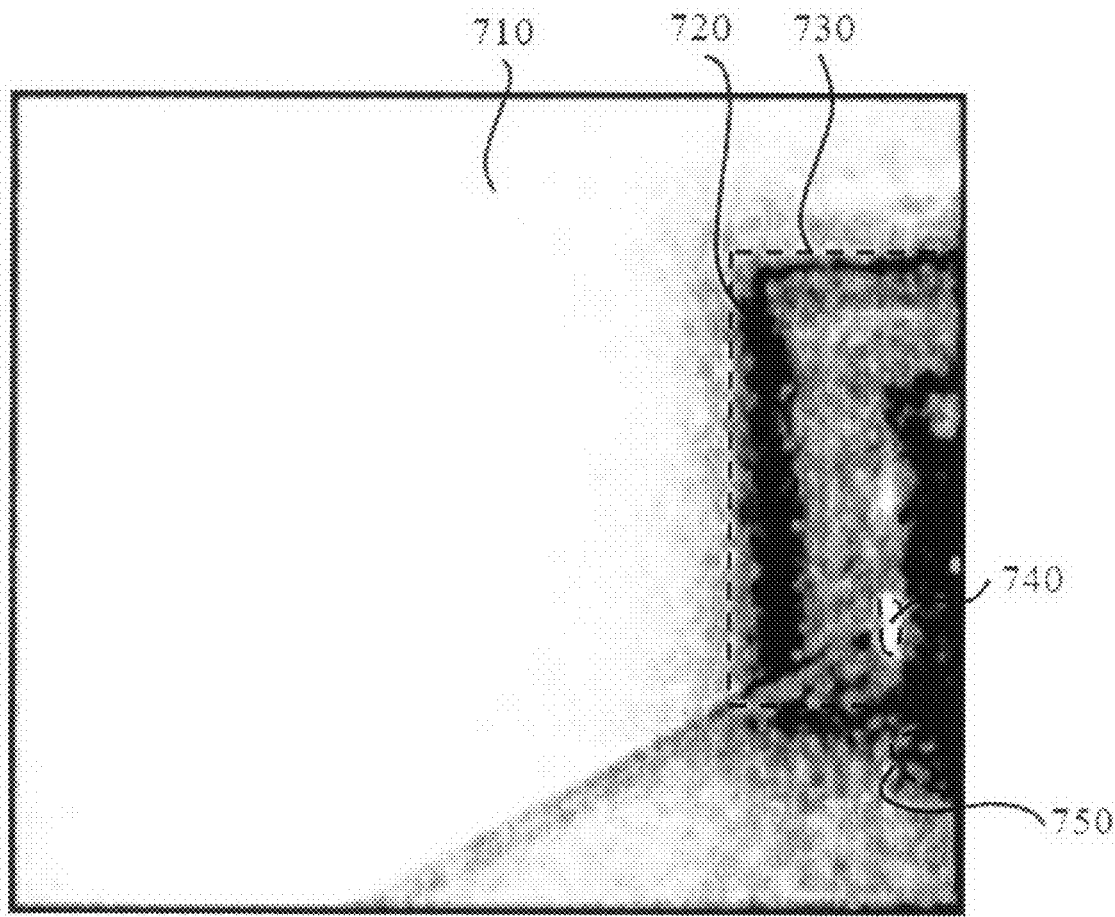
FIG. 7 illustrates a result image where a temporal variance of the input depth image of FIG. 5 is calculated according to exemplary embodiments.

FIG. 7 illustrates a result image where a temporal variance of a depth value is calculated when a plurality of input depth images associated with the object of FIG. 4 is inputted according to exemplary embodiments.

In FIG. 7, change of depth value is illustrated in the plurality of input depth images. The plurality of input depth images is obtained by a single depth camera from a single viewpoint at different times. According to exemplary embodiments, a dark area corresponds to an area with a high temporal variance.

Since a temporal variance of each pixel of a region 710 where a depth folding does not occur is not high, the region 710 is relatively bright. However, a region 720 is relatively dark, since a variance of a measured value is high due to a decrease of reflected wave as a distance between the object and the depth camera increases.

According to exemplary embodiments, a third threshold value which is a temporal variance of a maximum measurement distance is provided. The third threshold value may be provided as a hardware specification of the depth camera, and determined by a test. Also, an area with a spatial variance greater than the third threshold value is determined as a depth folding region located beyond the maximum measurement distance, in the input depth image.

Pixels with a spatial variance greater than the third threshold value are determined as a depth folding pixel (a first pixel group) in the input depth image, and a region segmentation of the input depth image is performed based on the depth folding pixel. Then, the depth folding region may be determined. A depth folding line 730 may be a boundary between the region 710 and the region 720.

An area 740 with a variance less than the third threshold value exists in the depth folding region 720, and an area 750 with a variance greater than the third threshold value exists in the region 710 where the depth folding does not occur. The area 740 and area 750 may be an error factor when determining the depth folding region.

Figure 8:
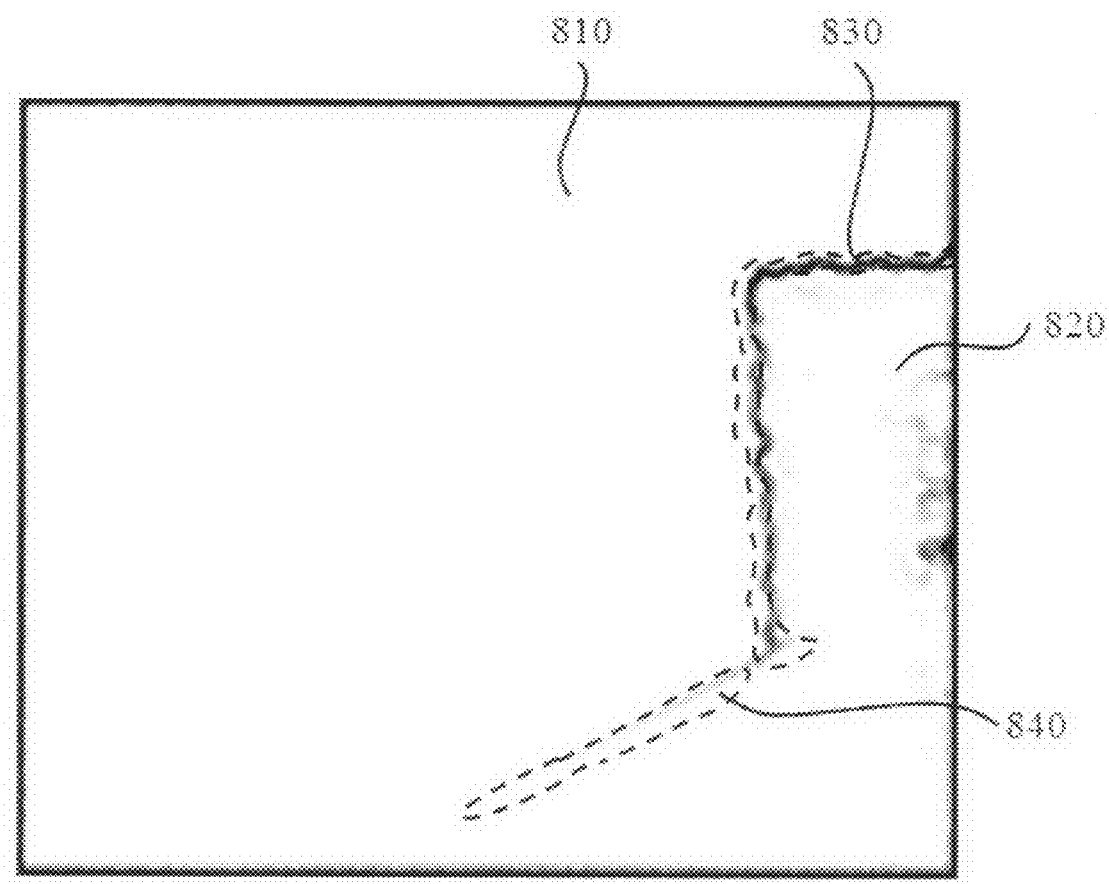
FIG. 8 illustrates a result image where a gradient of the input depth image of FIG. 5 is calculated according to exemplary embodiments.

FIG. 8 illustrates a result image where a gradient of the input depth image of FIG. 5 is calculated according to exemplary embodiments.

In a gradient image illustrated in FIG. 8, a brightness of a region 810 where depth folding does not occur and a brightness of depth folding region 820 are relatively high. However, a brightness of an area 830 including a depth folding line between the region 810 and the depth folding region 820 is low. Although a region 840 exists in the region 810 where a depth folding does not occur, a brightness of the region 840 is relatively low due to a physical characteristic of the object.

The gradient image may be used to determine the depth folding line of the input depth image. According to exemplary embodiments, the depth folding line of pixels included in an area with a high gradient value may be determined. However, an error factor such as the region 840 in which the depth folding line is not included exists, an additional operation may be required for more precise depth folding line determination.

Figure 9:
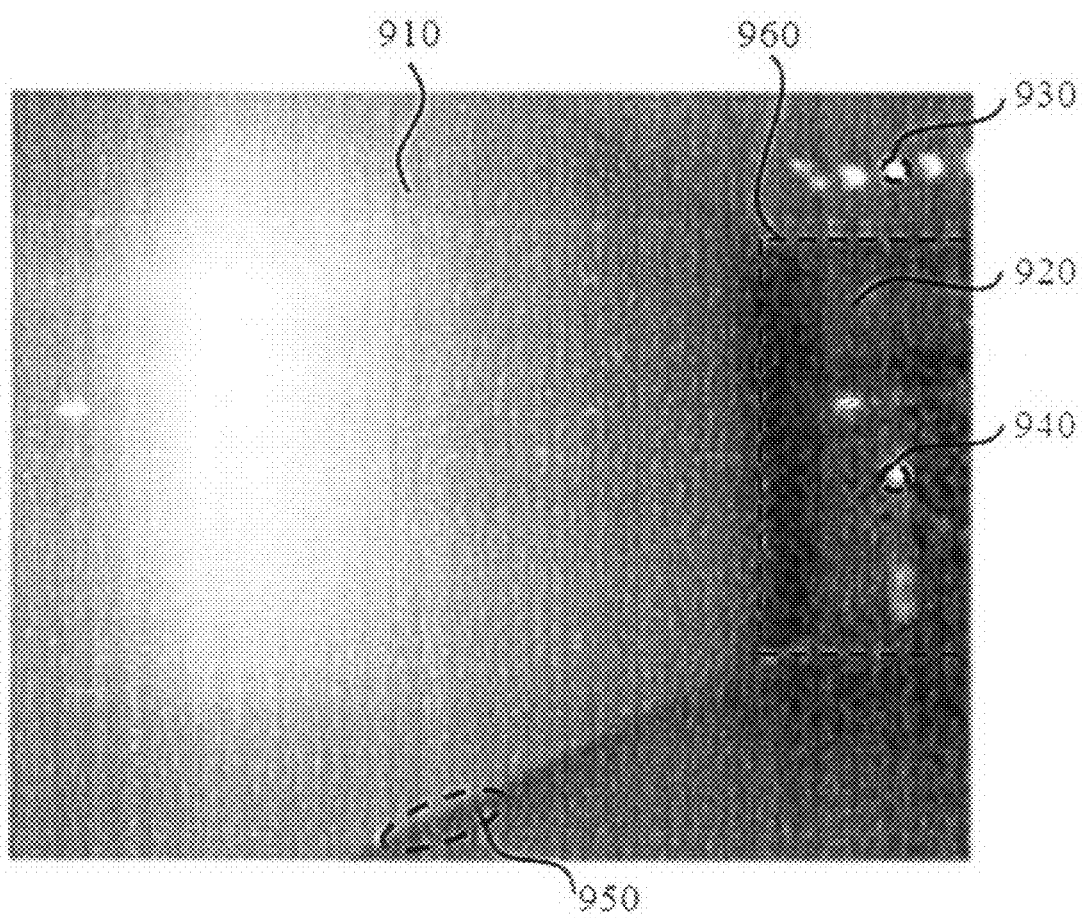
FIG. 9 illustrates an input intensity image according to exemplary embodiments.

FIG. 9 illustrates an input intensity image according to exemplary embodiments.

The intensity image may be obtained an intensity of reflected light sensed in a sensor unit of a depth camera while obtaining a depth image.

A region 910 corresponds to the region 510 of FIG. 5. Since the region 910 is relatively close to the depth camera, an intensity of reflected light is relatively high. Accordingly, the region 910 is bright. A region 920 corresponds to the region 520 of FIG. 5. Since the region 920 is relatively far from the depth camera, an intensity of reflected light is relatively low. Accordingly, the region 920 is dark. A depth folding line 960 corresponds to the depth folding line 530 of FIG. 5.

The intensity image may be influenced by lighting and texture, color, and reflection feature of an object. Accordingly, areas 930 and 940 relatively far from the depth camera may be bright, and an area 950 relatively close to the depth camera may be dark.

In general, however, it may be determined whether the object is close to the depth camera when using the intensity image. According to exemplary embodiments, a second threshold value which is an average intensity value in the maximum measurement distance of the depth camera may be provided. The second threshold value and an intensity of each pixel of the input intensity image may be compared. Pixels with an intensity less than the second threshold value are determined as a first pixel group where the depth folding occurs.

A depth folding region may be determined after a region segmentation with respect to the input depth image is performed based on information about the first pixel group. According to other exemplary embodiments, however, an area with an intensity less than the second threshold value may be determined as the depth folding region without performing the comparing.

Figure 10:
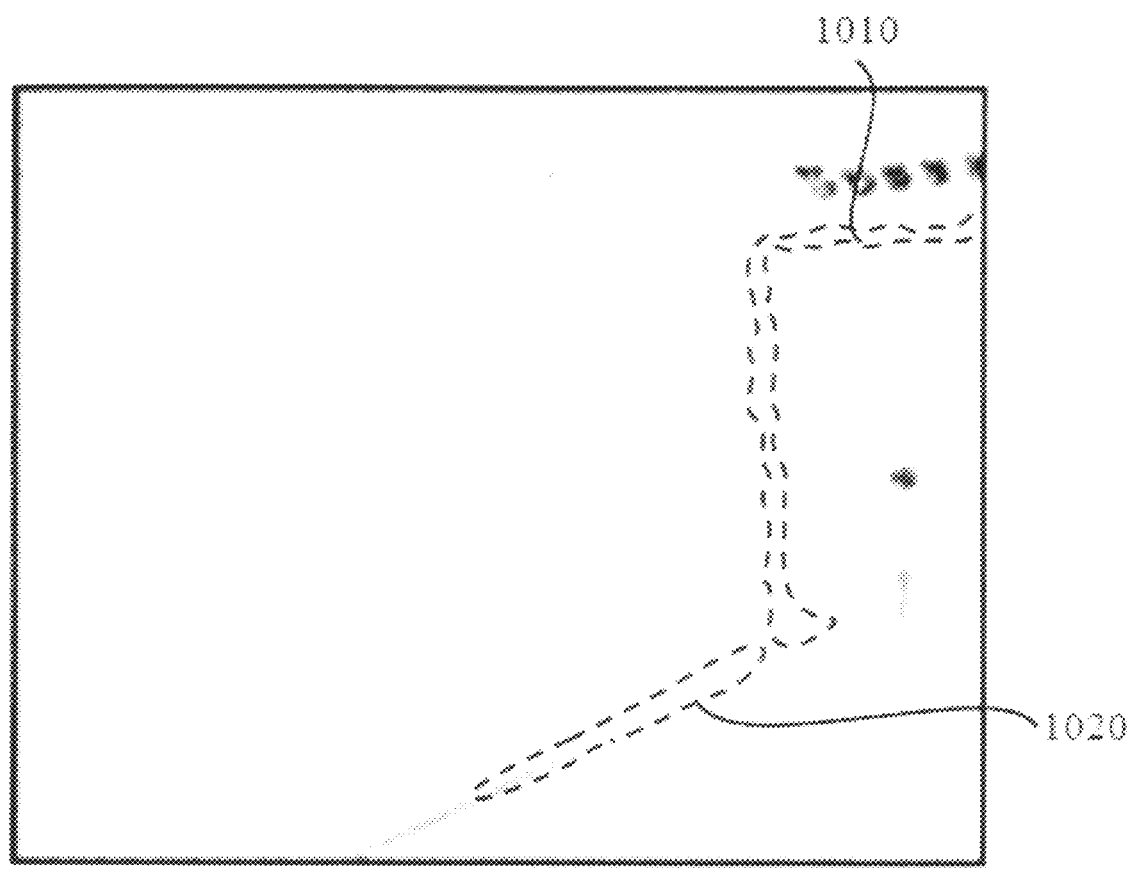
FIG. 10 illustrates a result image where a gradient of the input intensity image of FIG. 9 is calculated according to exemplary embodiments.

FIG. 10 illustrates a result image where a gradient of the input intensity image of FIG. 9 is calculated according to exemplary embodiments.

When compared to the gradient image of FIG. 8, a gradient of an area 1010 corresponding to the area 830 including the depth folding line is low, which indicates that the input depth image significantly changes and the input intensity image does not significantly change in the area 1010. Accordingly, the area 1010 may include the depth folding line.

Conversely, a gradient of an area 1020 is relatively high. The area 1020 corresponds to the region 840 in which the depth folding line is not included. Since the input depth image and input intensity image significantly change in the area 1020, geometry information of the object may not be distorted. Accordingly, the area 1020 may not include the depth folding line.

According to exemplary embodiments, a gradient of the input depth image may be compared to that of the input intensity image as described above, and thus the depth folding line of the input depth image may be determined.

Figure 11:
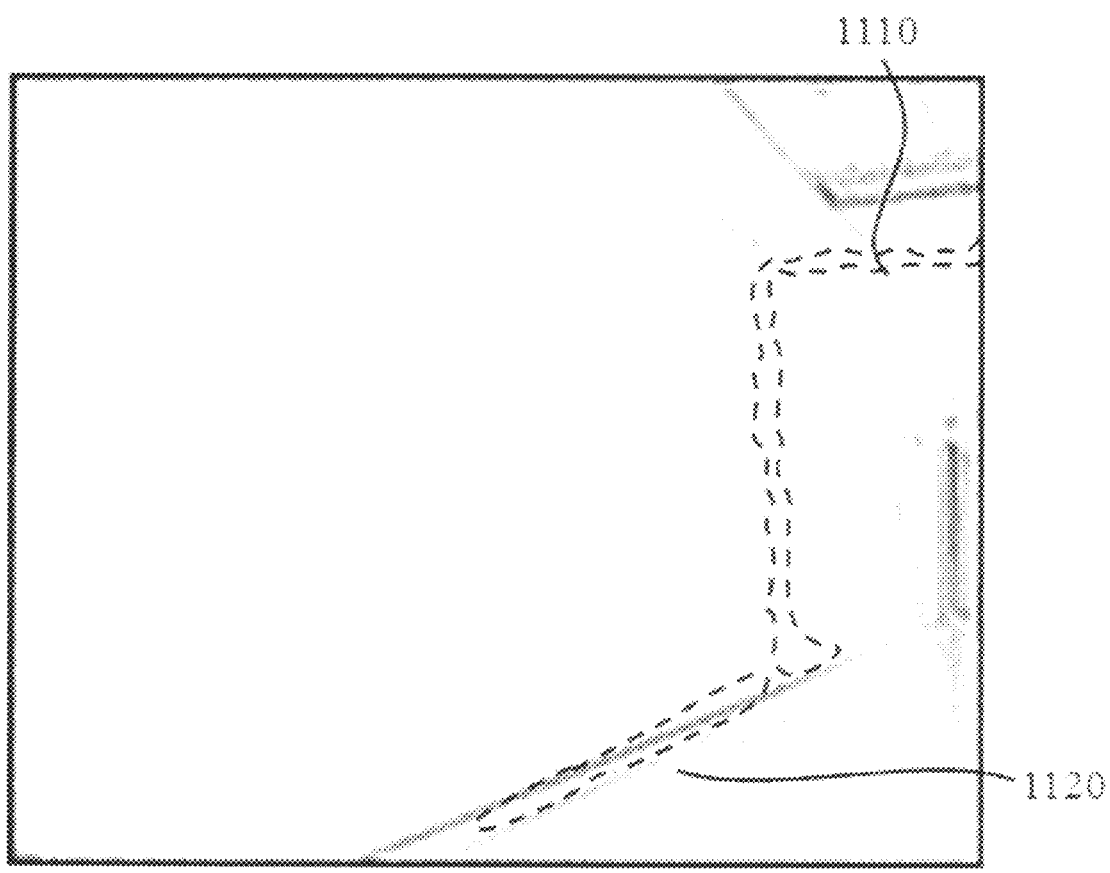
FIG. 11 illustrates a result image where a gradient of an input color image is calculated according to exemplary embodiments.

FIG. 11 illustrates a result image where a gradient of an input color image is calculated according to exemplary embodiments.

When compared to the gradient image of FIG. 8, a gradient of an area 1110 corresponding to the area 830 including the depth folding line is low, which indicates that the input depth image significantly changes and the input color image does not significantly change in the area 1110. Accordingly, the area 1110 may include the depth folding line.

Conversely, a gradient of an area 1120 is relatively high. The area 1120 corresponds to the region 840 in which the depth folding line is not included. Since the input depth image and input intensity image significantly change in the area 1120, geometry information of the object may not be distorted. Accordingly, the area 1120 may not include the depth folding line.

According to exemplary embodiments, a gradient of the input depth image is compared to that of the input color image as described above, and thus the depth folding line of the input depth image may be determined.

Also, the gradients of the input depth image, the input intensity image, and the input color image may be compared to determine the depth folding line of the input depth image.

Figure 12:
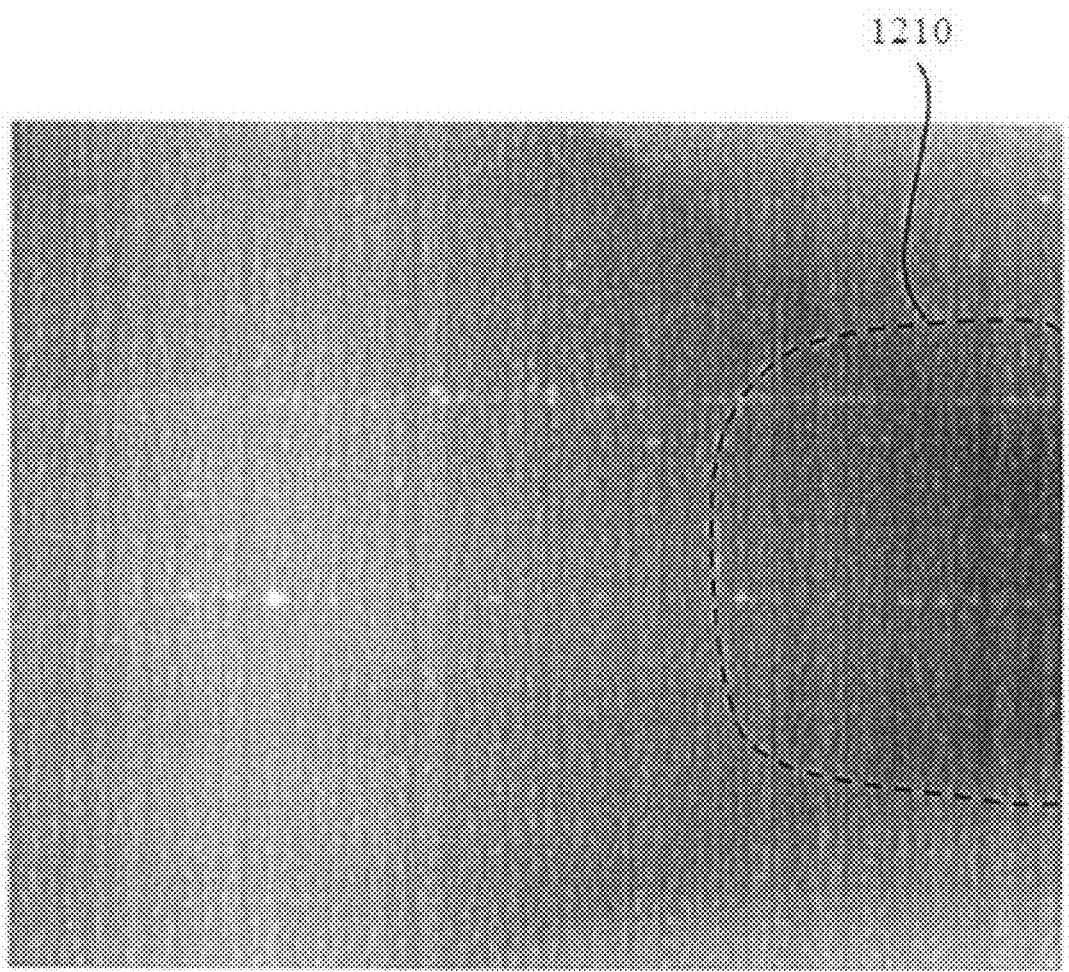
FIG. 12 illustrates a result image where an image processing method according to exemplary embodiments is applied to the input depth image of FIG. 5.

FIG. 12 illustrates a result image where an image processing method according to exemplary embodiments is applied to the input depth image of FIG. 5.

For depth unfolding, a depth value is added to each pixel of the determined depth folding region of the input depth image. The depth value corresponds to the maximum measurement distance.

An area 1210 where a depth folding has occurred is depth-unfolded, and thus the input depth image may include more accurate geometry information about the object.

According to exemplary embodiments, the depth value corresponding to the maximum measurement distance may be added to each of the pixels of the depth folding region of the input depth image, and thus a depth value of each of the pixels of the depth folding region may be updated. Also, various post processing is performed, and thus a more precise result may be obtained. For example, after updating the depth value, a Median filter may be applied.

Figure 13:
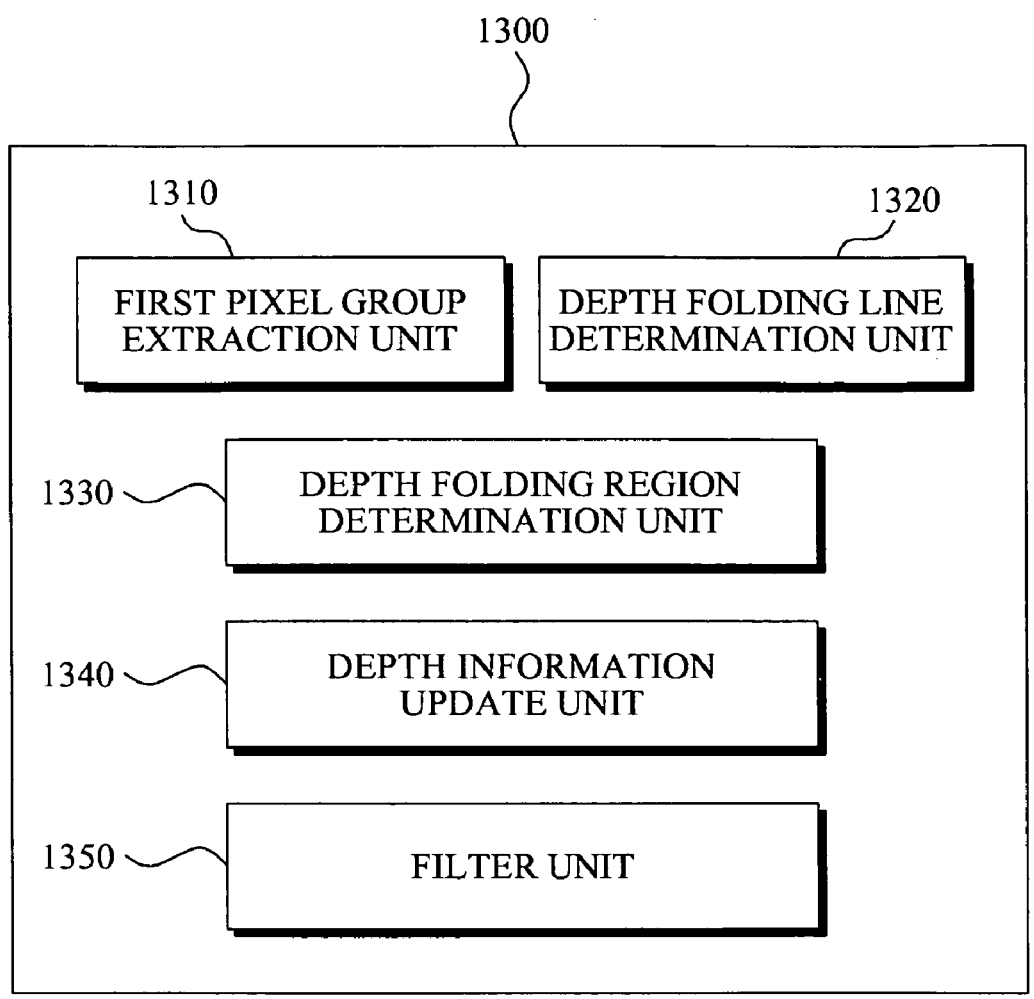
FIG. 13 illustrates a configuration of an image processing apparatus according to exemplary embodiments.

FIG. 13 illustrates a configuration of an image processing apparatus 1300 according to exemplary embodiments.

The image processing apparatus 1300 may include a first pixel group extraction unit 1310, depth folding line determination unit 1320, depth folding region determination unit 1330, depth information update unit 1340, and filter unit 1350.

The first pixel group extraction unit 1310 may extract a depth folding pixel where the depth folding occurs from an input depth image. Hereinafter, the depth folding pixel is referred to as a first pixel group.

According to exemplary embodiments, the first pixel group extraction unit 1310 may extract the first pixel group using a spatial variance of each pixel of the input depth image. A first threshold value, which is a spatial variance in a maximum measurement distance of a depth camera, is provided. In this instance, the depth folding does not occur in the maximum measurement distance. A pixel with a spatial variance greater than the first threshold value in the input depth image may be extracted as the first pixel group.

According to other exemplary embodiments, the first pixel group extraction unit 1310 may extract the first pixel group using a temporal variance of each pixel of the input depth image. A third threshold value, which is a temporal variance in the maximum measurement distance of the depth camera, is provided. A pixel with a temporal variance greater than the third threshold value in the input depth image may be extracted as the first pixel group. Also, a pixel having the spatial variance greater than the first threshold value and the temporal variance greater than the third threshold value may be extracted as the first pixel group.

When an intensity image is inputted, a second threshold value and an intensity of each pixel of the input intensity image may be compared. The second threshold value is an average intensity value in the maximum measurement distance of a depth camera. In this instance, the first pixel group extraction unit 1310 may determine pixels with an intensity less than the second threshold value as the first pixel group.

Also, a pixel having the spatial variance greater than the first threshold value, the temporal variance greater than the third threshold value, and the intensity less than the second threshold value may be determined as the first pixel group. The method of extracting the first pixel group by the first pixel group extraction unit 1310 has been described above in greater detail with reference to FIG. 2.

The depth folding line determination unit 1320 may determine a depth folding line of the input depth image.

According to exemplary embodiments, the depth folding line determination unit 1320 may extract a line of pixels with a high gradient value, and determine the line as a depth folding line.

When an intensity image is inputted, a gradient of the input depth image and a gradient of the input intensity image may be compared. When a pixel where a gradient of depth image is high and a gradient of input intensity image corresponding to the depth image is low exists in the input depth image, the pixel may be located in a boundary area between an area where the depth folding occurs and an area where the depth folding does not occur. Accordingly, the depth folding line determination unit 1320 may determine a line of the above-described pixel as the depth folding line of the input depth image.

Also, when a color image matched with the input depth image is inputted, a gradient of the input depth image and a gradient of the input color image may be compared. When a pixel where a gradient of depth image is high and a gradient of input color image corresponding to the depth image is low exists in the input depth image, the pixel may be located in the boundary area between the area where the depth folding occurs and the area where the depth folding does not occur. Accordingly, the depth folding line determination unit 1320 may determine a line of the above-described pixel as the depth folding line of the input depth image.

Also, the gradients of the input depth image, the input intensity image, and the input color image may be compared. In this case, an error may decrease.

The method of determining the depth folding line by the depth folding line determination unit 1320 has been described above in greater detail with reference to FIG. 3.

The depth folding region determination unit 1330 may determine a depth folding region of the input depth image.

According to exemplary embodiments, the depth folding region determination unit 1330 may perform a region segmentation of the input depth image. Since the determined first pixel group or depth folding line may not be continuous, and the area where the depth folding occurs and the area where the depth folding does not occur may not be precisely segmented due to an error, the region segmentation is to be performed.

The region segmentation may be performed based on information about the first pixel group. Also, the region segmentation may be performed based on information about the first pixel group and information about the depth folding line of the input depth image.

For example, the region segmentation may be performed more accurately through a hole filling in the depth folding line or the first pixel group which is discontinuous. Also, an accuracy of the region segmentation may be improved by referring to information about neighboring pixels of a pixel using a Markov random field.

According to exemplary embodiments, the depth folding region determination unit 1330 may determine the depth folding region of the input depth image using the information about the first pixel group and the information about the depth folding line of the input depth image based on result of the region segmentation.

The depth information update unit 1340 may update depth information about the input depth image.

According to exemplary embodiments, the depth information update unit 1340 may add a depth value corresponding to the maximum measurement distance to each pixel of the depth folding region determined by the depth folding region determination unit 1330, and thereby may update depth information such as the depth value for depth unfolding.

The filter unit 1350 may perform a post processing filtering with respect to the input depth image having the depth unfolding performed thereon.

A pixel where the depth unfolding is not performed may exist around the depth folding line (a boundary between the determined depth folding region and another region excluding the depth folding line), although the pixel is included in the depth folding region. Also, a pixel where the depth unfolding is performed may exist around the determined depth folding line, even though the pixel is not included in the depth folding region. Accordingly, an outlier is removed from the input depth image through the post processing filtering, and thus a more precise result may be obtained. For example, the filter unit 1350 may be a Median filter.

The image processing method according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable may also be executed and/or embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described exemplary embodiments.

Although a few exemplary embodiments have been shown and described, the exemplary embodiments are not limited thereby. Instead, it would be appreciated by those skilled in the art that changes may be made to these exemplary embodiments without departing from the principles and spirit of the disclosure, the scope of which is defined by the claims and their equivalents.

What is claimed is:
1. An image processing apparatus, comprising:
 a first pixel group extraction unit to extract a pixel with a spatial variance from each pixel of an input depth image as a first pixel group, the spatial variance being greater than a first threshold value; and a depth folding region determination unit, using at least one processor, to determine a depth folding region of the input depth image based on information about the first pixel group.

2. The image processing apparatus of claim 1, further comprising:
a depth folding line determination unit to determine a depth folding line of the input depth image based on a gradient of the input depth image,
wherein the depth folding region determination unit determines the depth folding region of the input depth image based on the information about the first pixel group and information about the depth folding line of the input depth image.

3. The image processing apparatus of claim 2, wherein the depth folding region determination unit performs a region segmentation based on at least one of the information about the first pixel group and the information about the depth folding line of the input depth image to determine the depth folding region of the input depth image.

4. The image processing apparatus of claim 1, further comprising:
a depth folding line determination unit to determine a depth folding line of the input depth image based on a gradient of the input depth image and a gradient of an input intensity image associated with the input depth image,
wherein the depth folding region determination unit determines the depth folding region of the input depth image based on the information about the first pixel group and information about the depth folding line of the input depth image.

5. The image processing apparatus of claim 4, wherein the depth folding region determination unit performs a region segmentation based on at least one of the information about the first pixel group and the information about the depth folding line of the input depth image to determine the depth folding region of the input depth image.

6. The image processing apparatus of claim 1, further comprising:
a depth folding line determination unit to determine a depth folding line of the input depth image based on a gradient of the input depth image and a gradient of an input color image associated with the input depth image,
wherein the depth folding region determination unit determines the depth folding region of the input depth image based on the information about the first pixel group and information about the depth folding line of the input depth image.

7. The image processing apparatus of claim 6, wherein the depth folding region determination unit performs a region segmentation based on at least one of the information about the first pixel group and the information about the depth folding line of the input depth image to determine the depth folding region of the input depth image.

8. The image processing apparatus of claim 1, further comprising:
a depth information update unit to add a depth value of each pixel of the depth folding region of the input depth image to a predetermined first depth value and update depth information of the input depth image.

9. The image processing apparatus of claim 8, further comprising:
a filter unit to perform a post processing filtering with respect to the updated input depth image.

10. An image processing method, comprising:
calculating, using at least one processor, a spatial variance of each pixel of an input depth image; and
extracting a pixel with a spatial variance greater than a first threshold value from each of the pixels of the input depth image as a first pixel group.

11. The image processing method of claim 10, further comprising:
determining a depth folding region of the input depth image based on information about the first pixel group.

12. The image processing method of claim 11, further comprising:
determining a depth folding line of the input depth image based on a gradient of the input depth image,
wherein the determining of the depth folding region determines the depth folding region of the input depth image based on the information about the first pixel group and information about the depth folding line of the input depth image.

13. The image processing method of claim 11, further comprising:
determining a depth folding line of the input depth image based on a gradient of the input depth image and a gradient of an input intensity image associated with the input depth image,
wherein the determining of the depth folding region determines the depth folding region of the input depth image based on the information about the first pixel group and information about the depth folding line of the input depth image.

14. An image processing method, comprising:
extracting a first pixel group from each pixel of an input depth image, the first pixel group including a pixel with a spatial variance greater than a first threshold value;
extracting a second pixel group from each pixel of an input intensity image associated with the input depth image, the second pixel group including a pixel with an intensity less than a second threshold value; and
determining, using at least one processor, a depth folding region of the input depth image based on information about the first pixel group and second pixel group.

15. The image processing method of claim 14, further comprising:
determining a depth folding line of the input depth image based on a gradient of the input depth image and a gradient of an input color image associated with the input depth image,
wherein the determining of the depth folding region determines the depth folding region of the input depth image based on the information about the first pixel group and the second pixel group, and information about the depth folding line of the input depth image.

16. The image processing method of claim 14, further comprising:
determining a depth folding line of the input depth image based on a gradient of the input depth image and a gradient of the input intensity image associated with the input depth image,
wherein the determining of the depth folding region determines the depth folding region of the input depth image based on the information about the first pixel group and the second pixel group, and information about the depth folding line of the input depth image.

17. The image processing method of claim 14, further comprising:
adding a predetermined first depth value to a depth value of each pixel of the depth folding region of the input depth image and updating the depth value of the input depth image.

18. The image processing method of claim 17, further comprising:

performing a post processing filtering with respect to the updated input depth image.

19. An image processing method, comprising:

calculating a temporal variance of each pixel of a plurality of input depth images associated with a single object;

extracting a pixel with a temporal variance greater than a threshold value from each of the pixels of the plurality of input depth images as a first pixel group; and determining, using at least one processor, a depth folding region of the plurality of input depth images based on information about the first pixel group.

20. A non-transitory computer-readable recording medium having stored thereon instructions for implementing an image processing method, the instructions comprising:

an instruction set which calculates a spatial variance of each pixel of an input depth image, wherein the instruction set is executed by at least one processor;

an instruction set which calculates a pixel with a spatial variance greater than a first threshold value from each of the pixels of the input depth image as a first pixel group; and an instruction set which determines a depth folding region of the input depth image based on information about the first pixel group.

* * * * *

UNITED STATES PATENT AND TRADEMARK OFFICE
CERTIFICATE OF CORRECTION

PATENT NO. : 8,305,377 B2
APPLICATION NO. : 12/385625
DATED : November 6, 2012
INVENTOR(S) : Hwa Sup Lim et al.

It is certified that error appears in the above-identified patent and that said Letters Patent is hereby corrected as shown below:

Title Page Col. 2 (Abstract); Line 4, Delete "depth," and insert -- depth --, therefor.

Signed and Sealed this
Seventh Day of May, 2013

Teresa Stanek Rea
*Acting Director of the United States Patent and Trademark Office*